United States Patent
Surnilla (10) Patent No.: US 8,132,546 B2
(45) Date of Patent: Mar. 13, 2012

(54) CONTROL STRATEGY FOR MULTI-STROKE ENGINE SYSTEM

(75) Inventor: Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 939 days.

(21) Appl. No.: 12/117,662

(22) Filed: May 8, 2008

(65) Prior Publication Data

US 2009/0277434 A1   Nov. 12, 2009

(51) Int. Cl.
*F02B 69/06* (2006.01)
*F01L 1/34* (2006.01)

(52) U.S. Cl. .................... 123/21; 123/90.15

(58) Field of Classification Search ........... 123/21, 123/65 VD, 90.15–90.18
See application file for complete search history.

(56) References Cited

U.S. PATENT DOCUMENTS

| | | | |
|---|---|---|---|
| 5,154,141 A * | 10/1992 | McWhorter | 123/21 |
| 5,158,044 A | 10/1992 | Kawamura | |
| 5,193,492 A * | 3/1993 | Kawamura | 123/21 |
| 5,230,320 A * | 7/1993 | Hitomi et al. | 123/559.1 |
| 5,284,116 A * | 2/1994 | Richeson, Jr. | 123/406.2 |
| 5,517,951 A * | 5/1996 | Paul et al. | 123/21 |
| 6,257,176 B1 * | 7/2001 | Shimasaki et al. | 123/21 |
| 6,363,907 B1 | 4/2002 | Arai et al. | |
| 7,036,465 B2 | 5/2006 | Burk et al. | |
| 7,082,898 B2 | 8/2006 | Kitamura et al. | |
| 7,231,892 B2 | 6/2007 | Kojic et al. | |
| 2006/0048981 A1 * | 3/2006 | Bychkovski | 180/65.2 |
| 2007/0012265 A1 * | 1/2007 | Lewis et al. | 123/21 |
| 2007/0062485 A1 | 3/2007 | Yamaoka et al. | |
| 2007/0113542 A1 * | 5/2007 | Lewis | 60/285 |
| 2007/0234982 A1 * | 10/2007 | Kolmanovsky et al. | 123/90.11 |
| 2008/0022666 A1 * | 1/2008 | Driscoll et al. | 60/286 |
| 2008/0066727 A1 * | 3/2008 | Kato et al. | 123/703 |
| 2009/0025679 A1 * | 1/2009 | Winstead | 123/294 |

FOREIGN PATENT DOCUMENTS

EP   1291507   3/2003

* cited by examiner

*Primary Examiner* — Michael Cuff
*Assistant Examiner* — Tea Bajramovic
(74) *Attorney, Agent, or Firm* — Allan J. Lippa; Alleman Hall McCoy Russell & Tuttle LLP (57) ABSTRACT

An engine system and a method of operation are described. The engine may be operating in two-stroke and four-stroke modes while still maintaining a target exhaust air-fuel ratio.

15 Claims, 8 Drawing Sheets

|  | CAM PROFILE SWITCHING TRANSITION WINDOW | |
| --- | --- | --- |
| TRANSITIONS BETWEEN TWO AND FOUR STROKE CYCLES | AFTER | BEFORE |
| INTAKE VALVE TRANSITION WINDOW | LATTER OF 2-IVC AND 4-IVC | 2-IVO |
| EXHAUST VALVE TRANSITION WINDOW | 2-EVC | EARLIER OF 2-EVO AND 4-EVO |
| INTAKE AND EXHAUST VALVE TRANSITION WINDOW | LATTER OF 2-IVC AND 4-IVC | EARLIER OF 2-EVO, 4-EVO, AND 2-IVO |

FIG. 8

CONTROL STRATEGY FOR MULTI-STROKE ENGINE SYSTEM

BACKGROUND AND SUMMARY

Internal combustion engines can carry out combustion by repeatedly admitting air and fuel into the cylinder, combusting the air and fuel, and exhausting the products of combustion from the cylinder. Some engines may perform these processes by operating in what may be referred to as a two stroke cycle, which corresponds to a combustion event being performed every two strokes of the cylinder's piston. Other engines may perform these processes by instead operating in a four stroke cycle, which corresponds to a combustion event every four strokes of the piston.

The four stroke cycle may be advantageously used in some examples to provide increased engine efficiency as compared to a comparable two stroke cycle, since air and fuel may be more thoroughly mixed in the four stroke cycle. However, the two stroke cycle may be advantageously used in other examples to provide increased power or torque output as compared to the four stroke cycle, since combustion within the cylinder can be performed at twice the frequency as the four stroke cycle for a given engine speed.

To take advantage of both the two stroke and four stroke cycles, some engines can be configured to selectively transition between two stroke and four stroke operation. For example, U.S. Pat. No. 6,257,176 depicts an engine that can be operated in either a two stroke or four stroke cycle. However, the inventor has recognized some issues associated with this approach.

As one example, the inventor has recognized that some exhaust after treatment devices for treating an exhaust stream produced by the engine may operate most effectively when receiving a specific exhaust gas composition. For example, some exhaust after treatment devices may most efficiently treat exhaust gas that corresponds to a stoichiometric or near stoichiometric ratio of air and fuel. Yet, selectively operating a cylinder in a two or four stroke cycle under different conditions can present challenges for air and fuel control at the after treatment device. As one example, the amount of exhaust gases remaining in the cylinder and the amount of intake air passing through the cylinder without undergoing combustion may differ considerably in each of the two and four stroke cycles, thereby potentially causing substantial variations in exhaust gas composition where a similar control strategy is employed during two stroke and four stroke cycles.

To address some of these issues, the inventor herein has provided a method of operating an internal combustion engine. As one example, the method may include: during a first operating condition, operating a cylinder of the engine in a two stroke cycle to combust a first mixture of air and fuel, and adjusting an opening overlap between an intake poppet valve and an exhaust poppet valve of the cylinder to vary a composition of exhaust gases exhausted by the cylinder via the exhaust poppet valve; and during a second operating condition, operating a cylinder of the engine in a four stroke cycle to combust a second mixture of air and fuel, and adjusting a relative amount of fuel contained in the second mixture of air and fuel to vary the composition of exhaust gases exhausted by the cylinder via the exhaust poppet valve.

In some examples, the combustion chamber may be supplied with a richer air and fuel mixture during the two stroke cycle than during the four stroke cycle while obtaining a similar air-fuel ratio at the exhaust after treatment device by adjusting, via valve timing and/or engine boosting, an amount of un-combusted intake air (e.g., blow-by) that passes through the cylinder during the two stroke cycle. In this way, the resulting exhaust gas composition that is received at the exhaust after treatment device can be better controlled to a target value even as the engine is transitioned between two stroke and four stroke cycles, and even as the engine continues to operate in the two stroke and four stroke cycles.

DETAILED DESCRIPTION

An approach for controlling an engine system is described herein. As one example, the engine system may be configured to transition between a two stroke cycle and a four stroke cycle in response to changing operating conditions. The delivery of a suitable amount of air and fuel to the engine may be facilitated using different approaches during the two stroke cycle than during the four stroke cycle.

As a non-limiting example, an amount of un-combusted intake air that passes through the engine cylinders (i.e. blow-by) may be adjusted during the two stroke cycle to achieve a target composition of the exhaust gases provided to an exhaust after treatment device of the engine. In some embodiments, the amount of un-combusted intake air passing through these cylinders during the two stroke cycle may be adjusted by varying an opening overlap between the intake and exhaust valves of the engine cylinders.

For example, by increasing the opening overlap between the intake and exhaust valves and/or increasing a level of boost provided to the engine, the amount of un-combusted intake air supplied to the exhaust system of the engine may be increased, thereby increasing the relative amount or concentration of elemental oxygen contained in the exhaust stream. Conversely, by reducing the opening overlap between the intake and exhaust valves and/or reducing the level of boost provided to the engine, the relative amount or concentration of elemental oxygen contained in the exhaust stream may be reduced. In this way, exhaust gas composition may be adjusted to a target value during at least the two stroke cycle, particularly where the engine is configured with intake and exhaust poppet valves having variable timing.

Figure 1:
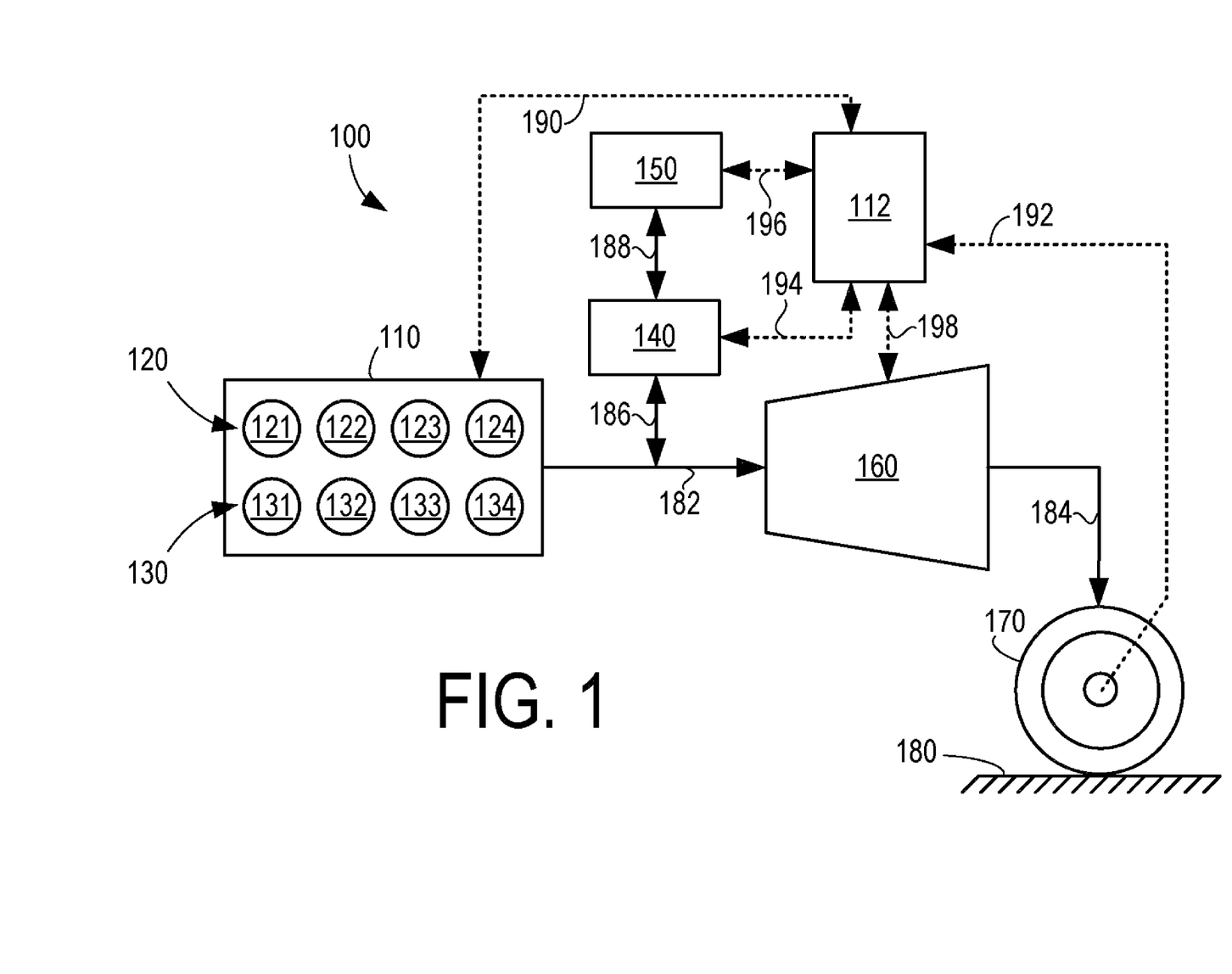
FIG. 1 depicts an example embodiment of a vehicle propulsion system.

FIG. 1 depicts an example embodiment of a vehicle propulsion system 100. In this particular example, vehicle propulsion system 100 includes an internal combustion engine 110 configured to combust a fuel to produce an engine output indicated schematically at 182.

Engine output 182 can be supplied to one or more drive wheels of the vehicle via a transmission. For example, engine output 182 can be received to transmission 160 where it may be converted to a transmission output 184 by an suitable gearing associated with transmission 160. For example, transmission 160 may be configured to provide one or more gear ratios between engine output 182 and transmission output 184. Transmission output 184 may be supplied to drive wheel 170, which in turn can transmit the transmission output to ground surface 180.

Engine 110 may include one or more combustion chambers or cylinder. As a non-limiting example, engine 110 may include 1, 2, 3, 4, 5, 6, 8, 10, or more cylinders. As shown in FIG. 1, engine 110 includes a total of 8 cylinders indicated schematically at 121-124 and 131-134. Further, in some embodiments, the various cylinders of engine 110 may be divided into two or more cylinder groups or banks. As shown in FIG. 1, cylinders 121-124 may comprise a first cylinder group 120 and cylinders 131-134 may comprise a second cylinder group 130.

In some embodiments, vehicle propulsion system 100 may be configured as a hybrid propulsion system, and may include a motor/generator 140 and an energy storage device 150. Motor/generator 140 can utilize energy stored at energy storage device 150 as indicated at 188 to provide produce a motor output 186 that can supplement or replace engine output 182. Thus, under some conditions, motor/generator 140 can partially or completely propel the vehicle by supplying motor output 186 to one or more of the vehicle drive wheels. In some examples, motor output 186 may be transmitted to the drive wheels via transmission 160 as shown in FIG. 1, or may be transmitted directly to one or more drive wheels by bypassing transmission 160.

Further, in some embodiments, motor/generator can absorb at least a portion of engine output 182 and convert the absorbed energy into a form that is suitable for storage at energy storage device 150. Further still, in some embodiments, motor/generator can provide regenerative braking by absorbing and storing at energy storage device 150, at least some rotational energy from drive wheel 170 via transmission 160. As a non-limiting example, motor/generator 140 can be configured as an electric motor/generator and energy storage device 150 may be configured as an electrical buffer such as one or more batteries or capacitors. In some embodiments, motor/generator 140 may include separate motor and generator components. Further, in some embodiments, motor/generator 140 and/or energy storage device 150 may be omitted.

Vehicle propulsion system 100 may further include a control system indicated schematically at 112. Control system 112 may be configured to receive an indication of operating conditions of the vehicle propulsion system from one or more sensors communicatively coupled thereto, and may be configured to adjust one or more operating parameters of the vehicle propulsion system in response to the operating conditions. For example, control system 112 can receive an indication of engine operating conditions and adjust engine operating parameters of engine 110 via 190, can receive an indication of transmission conditions and adjust transmission operating parameters of transmission 160 via 198, can receive an indication vehicle speed via 192, can receive an indication of motor/generator conditions and adjust operating parameters of motor generator 140 via 194, and can receive an indication of energy storage device conditions and adjust operating parameters of energy storage device 150 via 196.

For example, the control system can receive an indication of battery state of charge from energy storage device 150 and can selectively operate motor/generator 140 to absorb or supplement engine output 182, or to provide regenerative braking to the vehicle by absorbing rotational energy of drive wheel 170. Control system 112 and engine 110 will be described in greater detail with reference to FIG. 2.

Figure 2:
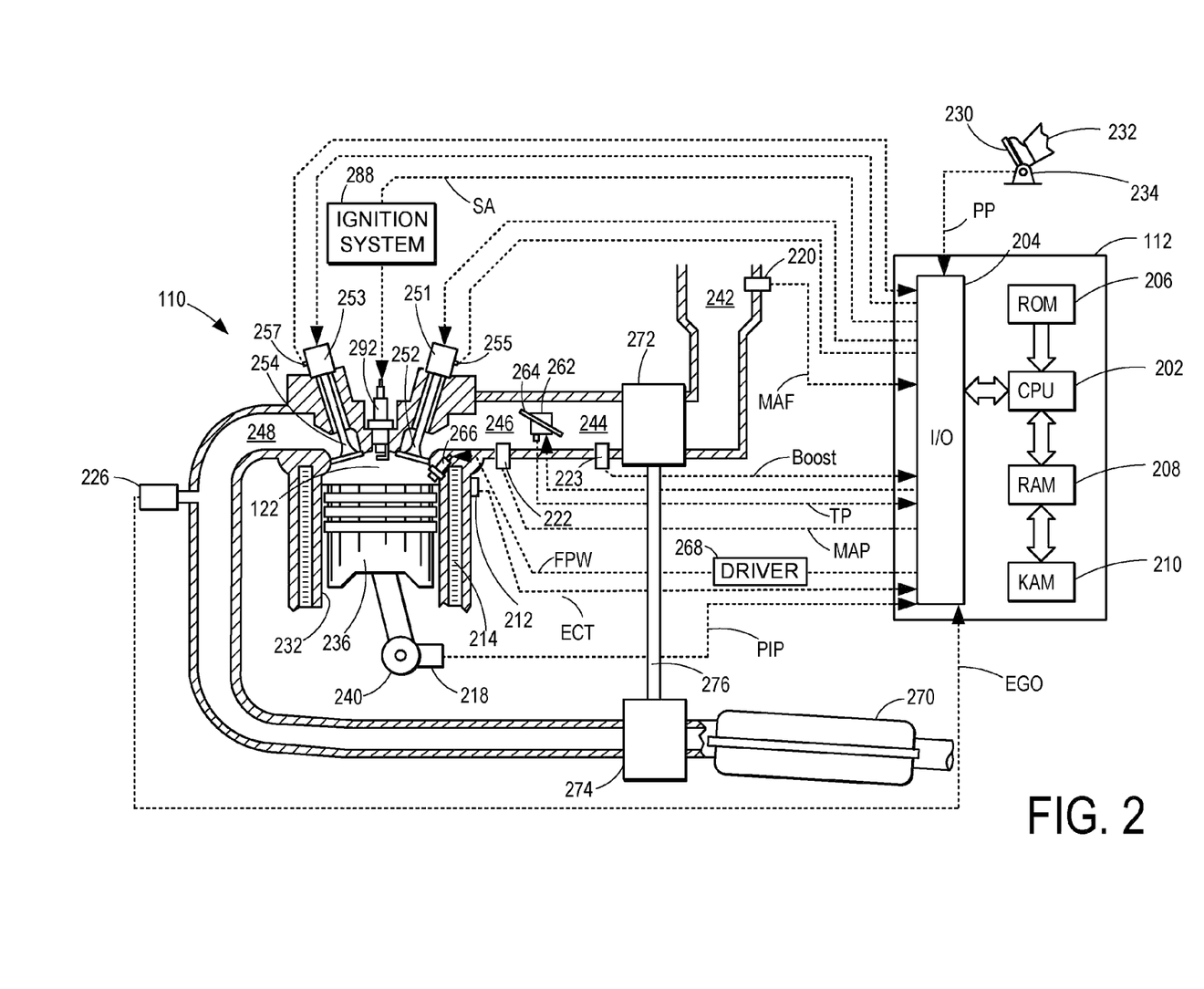
FIG. 2 depicts an example embodiment of a combustion chamber of an internal combustion engine.

FIG. 2 depicts an example embodiment of a combustion chamber or cylinder of internal combustion engine 110. While engine 110 is described in the context of cylinder 122, it should be appreciated that FIG. 2 may refer to any one of cylinders 121-124 or 131-134.

Cylinder 122 may be at least partially defined by combustion chamber walls 232 and piston 236. Piston 236 may be configured to reciprocate within cylinder 122 and may be coupled to crankshaft 240 via a crank arm. Other cylinders such as cylinders 121-124 and 131-134 of engine 110 may also include respective pistons that are also coupled to crankshaft 240 via their respective crank arms.

Cylinder 122 can receive intake air via a series of intake air passages 242, 244, and 246. Intake air passage 246 can communicate with other cylinders of engine 110 in addition to cylinder 122. In some embodiments, one or more of the intake passages may include a boosting device such as a turbocharger or a supercharger. For example, FIG. 2 shows engine 110 configured with a turbocharger including a compressor 272 arranged between intake passages 242 and 244, and an exhaust turbine 274 arranged along exhaust passage 248. Compressor 272 may be at least partially powered by exhaust turbine 274 via a shaft 276 where the boosting device is configured as a turbocharger. However, in other examples, such as where engine 110 is provided with a supercharger, exhaust turbine 274 may be optionally omitted, where compressor 272 may be powered by mechanical input from a motor or the engine.

Exhaust passage 248 can receive exhaust gases from other cylinders of engine 110 in addition to cylinder 122. Exhaust passage 248 may include one or more exhaust after treatment devices indicated generally at 270. For example, exhaust after treatment device 270 may include any suitable exhaust catalyst, filter, or trap. A throttle 262 including a throttle plate 264 may be provided along an intake passage of the engine for varying the flow rate and/or pressure of intake air provided to the engine cylinders. For example, throttle 262 may be disposed downstream of compressor 272 as shown in FIG. 2, or may alternatively be provided upstream of compressor 272.

Each cylinder of engine 110 may include one or more intake valves and one or more exhaust valves. For example, cylinder 122 is shown including at least one intake poppet valve 252 and at least one exhaust poppet valve 254 located at an upper region of cylinder 122. In some embodiments, each cylinder of engine 110, including cylinder 122, may include at least two intake poppet valves and at least two exhaust poppet valves located at an upper region of the cylinder.

These intake valves and exhaust valves may be opened and closed by any suitable actuator, including electromagnetic valve actuators (EVA) and cam-follower based actuators, among others. For example, the position of intake poppet valve 252 may be adjusted by an intake valve actuator 251 and the position of exhaust poppet valve 253 may be adjusted by an exhaust valve actuator 253. In other embodiments, the intake and exhaust valves may be controlled by a common valve actuator or actuation system. Valve actuators 251 and 253 will be described in greater detail with reference to FIGS. 6 and 7.

In some embodiments, each cylinder of engine 110 may include a spark plug 292 for initiating combustion. However, in some embodiments, spark plug 292 may be omitted, such as where engine 110 may initiate combustion by auto-ignition or by injection of fuel as may be the case with some diesel engines. Further, each cylinder of engine 110 may be configured with one or more fuel injectors for providing fuel thereto. As a non-limiting example, cylinder 122 is shown including a fuel injector 266 that is configured as a direct fuel injector for injecting fuel directly into cylinder 122. However, in other examples, fuel injector 266 may be configured as a port fuel injector and may be arranged along intake passage 246, where fuel injected by the port fuel injector may be entrained into the cylinder via intake poppet valve 252.

As described with reference to FIG. 1, a control system 112 can control engine 110 among other components of the vehicle propulsion system. As a non-limiting example, control system 112 may comprise one or more electronic controllers. FIG. 2 depicts an example embodiment of control system 112, including at least one processor (CPU) 202 and memory such as one or more of read-only memory ROM 206, random-access memory RAM 208, and keep-alive memory (KAM) 210, which comprise computer-readable media that may be operatively coupled to the processor. Thus, one or more of ROM 206, RAM 208, and KAM 210 can include system instructions that, when executed by the processor performs one or more of the operations described herein, such as the process flow of subsequent the figures. Processor 202 can receive one or more input signals from various sensory components and can output one or more control signals to the various control components described herein via input/output (I/O) interface 204. In some examples, one or more of the various components of control system 112 can communicate via a data bus.

Control system 112 may be configured to receive an indication of operating conditions associated with engine 110 among the other components of previously described propulsion system 100. For example, control system 112 can receive operating condition information from various sensors, including: an indication of mass air flow (MAF) from mass air flow sensor 222; an indication of intake or manifold air pressure (MAP) from pressure sensor 220, an indication of boost from sensor 223, an indication of throttle position (TP) from throttle 262, an indication of engine coolant temperature (ECT) from temperature sensor 212 coupled to cooling sleeve 214, and an indication of engine speed from a profile ignition pickup signal (PIP) via Hall effect sensor 218 (or other suitable engine speed sensor) coupled with crankshaft 240. Further still, user input may be received by the control system from a vehicle operator 232 via an accelerator pedal 230 operatively coupled with a pedal position sensor 234, thereby providing an indication of pedal position (PP). The pedal position can provide the control system with an indication a desired engine output by the vehicle operator.

The control system can also receive an indication of exhaust gas composition (EGO) from exhaust gas sensor 226. As a non-limiting example, exhaust gas sensor 226 may include an exhaust gas oxygen sensor for detecting an elemental oxygen component of the exhaust gases or exhaust gas mixture produced by the engine, among other suitable exhaust gas sensors. The control system may be further configured to utilize feedback from exhaust gas sensor 226 to identify or infer a resulting composition of a mixture of air and fuel delivered to the engine during previous combustion events, and may enable the control system to adjust one or more of the air quantity, fuel quantity, and valve timing in response to this feedback to obtain a target cylinder charge and exhaust gas composition.

Control system 112 may also be configured to respond to the various indications of operating conditions that are received from the various sensors by adjusting one or more operating parameters of the engine. As one example, the control system may be configured to increase or decrease the engine output (e.g. engine torque and/or engine speed) in response to an indication of pedal position received from pedal position sensor 234. The control system may be configured to vary the amount of fuel delivered to the engine via fuel injector 266 by adjusting a fuel injector pulse-width via driver 268, thereby varying the composition of an air and fuel mixture combusted at the engine. The control system may vary the spark timing provided to each cylinder via ignition system 288. The control system may vary the valve timing of the intake and exhaust poppet valves via valve actuators 255 and 257, respectively. The control system may adjust the level of boosted intake air provided to the engine by adjusting an operating parameter of the boosting device. Further still, the control system may adjust throttle position via electronic throttle control.

Figure 3:
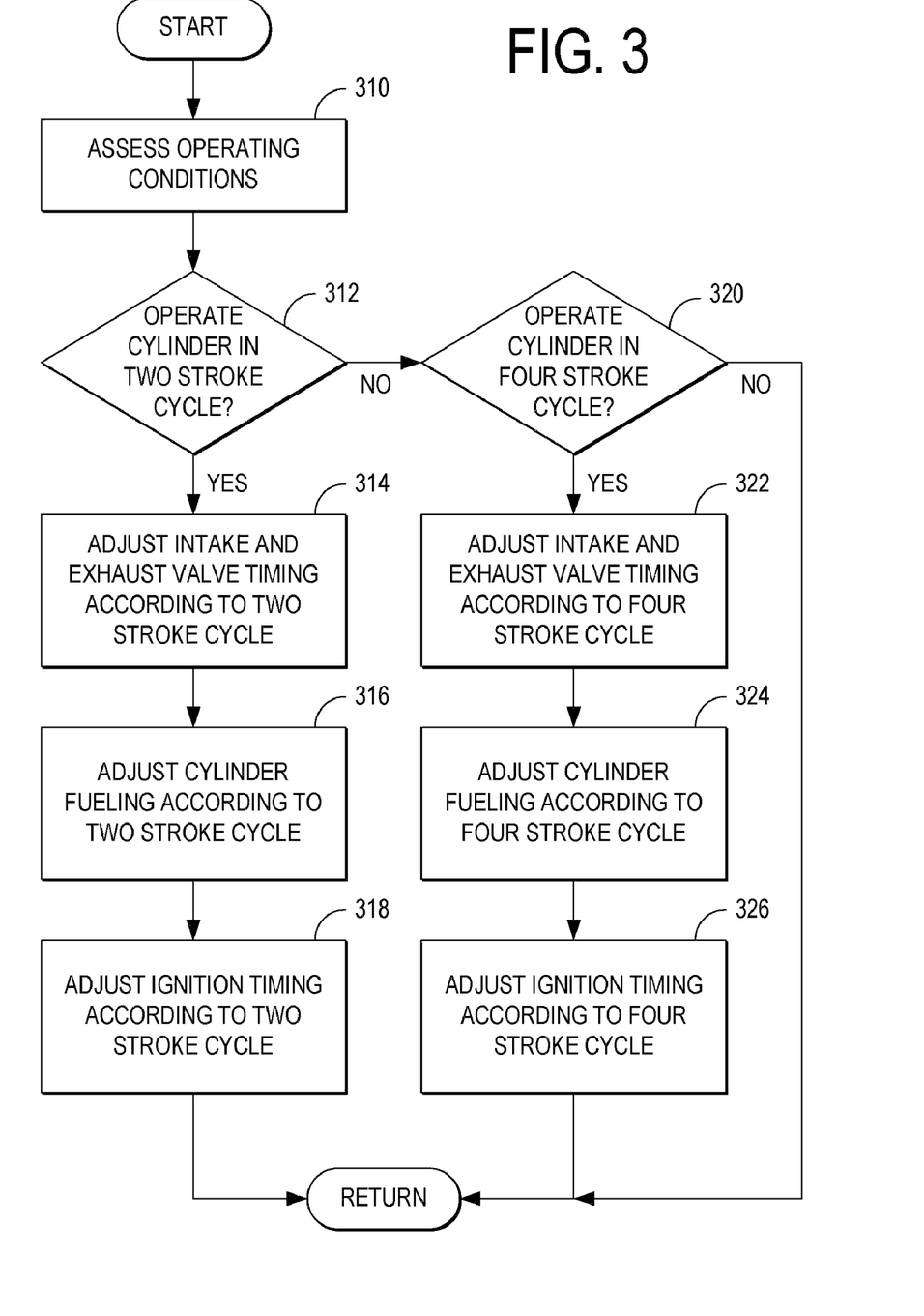
FIG. 3 depicts an example process flow for selectively operating an internal combustion engine in one of a two stroke combustion cycle and a four stroke combustion cycle.

FIG. 3 depicts an example process flow for selectively operating an internal combustion engine in one of a two stroke combustion cycle and a four stroke combustion cycle. While FIG. 3 will be described in the context of operating a single cylinder of an engine, it should be appreciated that the approaches described herein may be applied to some or all cylinders of the engine.

At 310, operating conditions of the vehicle propulsion system may be assessed. For example, the control system may assess operating conditions associated with the engine and transmission as well as the motor/generator and energy storage device where applicable. As one example, these operating conditions may be assessed by the control system via one or more of the various sensors associated with the engine. As described herein, operating conditions may include one or more of the following: engine speed, engine load, engine output (e.g. torque, power, etc.), fuel injection amount, fuel injection timing, intake air pressure, intake air temperature, intake mass airflow rate, throttle position, boost pressure, boosting device conditions, exhaust temperature, exhaust gas composition, valve timing, after treatment device temperature or loading, after treatment device purging schedules, operator input (e.g. via pedal 130), spark timing, current number of strokes performed by the engine (e.g. 2, 4, or more), among others and combinations thereof.

At 312, where one or more cylinders of the engine are operating or are to be operated in a two stroke cycle, the process flow may proceed to 314. For example, the control system may judge at 312 whether the engine or a particular cylinder of the engine is to be operated in a two stroke cycle in response to the operating conditions assessed at 310.

As a non-limiting example, the control system may judge that the two stroke cycle is to be performed by the engine cylinders when the engine is operating in one or more of the following: a first engine speed range, a first engine torque range, a first engine load range, a first engine temperature range, a first number range of combustion of events after engine start-up, and a first after treatment device temperature range. These ranges may be distinct from or may partially overlap ranges where the control system may judge that the engine is to instead perform a four stroke cycle rather than the two stroke cycle.

Alternatively, at 320, where one or more cylinders are operating or are to be operated in a four-stroke cycle, the process flow may proceed to 322. For example, the control system may judge at 320 whether the engine or a particular cylinder of the engine is to be operated in a four stroke cycle in response to the operating conditions assessed at 310. For example, the control system may also judge that a four stroke cycle is to be performed by the engine cylinders when the engine is operating in one or more of the following: a second engine speed range, a second engine torque range, a second engine load range, a second engine temperature range, a second number range of combustion of events after engine start-up, and a second after treatment device temperature range.

Note that the second set of ranges described with reference to the four stroke cycle can be different than or partially overlap with the first set of ranges described with reference to the two stroke cycle. For example, the two stroke cycle may be performed at lower engine temperatures than the four stroke cycle. As another example, the two stroke cycle may be performed when the engine is to produce higher torques and the four stroke cycle may be performed when the engine is to produce lower torques. As yet another example, the two stroke cycle may be performed at lower engine speeds while the four stroke cycle is performed at higher engine speeds. It should be appreciated that the control system may utilize other or different criteria for selecting whether the two stroke cycle or four stroke cycle are to be performed by the engine.

Where the cylinder is to be operated in a two stroke cycle, at 314, the intake and/or exhaust valve timing may be adjusted so that combustion may carried out in the cylinder once every two piston strokes. For example, the control system may cause one or more of the intake valves to open every two piston strokes (e.g. approximately 360 crank angle degrees) to admit intake air into the cylinder and may cause one or more of the exhaust valves to open every two piston strokes (e.g. approximately 360 crank angle degrees) to exhaust products of combustion from the cylinder.

By contrast, where the cylinder is to be operated in a four stroke cycle, at 322, the intake and/or exhaust valve timing may be adjusted so that combustion may be carried out in the cylinder once every four piston strokes. For example, the control system may cause one or more of the intake valves to open every four piston strokes (e.g. approximately 720 crank angle degrees) to admit intake air into the cylinder and may cause one or more of the exhaust valves to open every four piston stroke (e.g. approximately 720 crank angle degrees) to exhaust products of combustion from the cylinder.

Returning to the two stroke cycle, at 316, fuel delivered to the cylinder may be adjusted according to the selected two stroke cycle. For example, the control system may be configured to adjust the fuel injection timing of fuel injector 266 via driver 268 so that fuel is delivered to the combustion chamber every two strokes. The fuel delivered to the cylinder can be mixed with intake air received by the cylinder from a previous intake event at 314 as well as products of combustion retained in the cylinder from a previous combustion event. Further, the control system can vary the pulse-width of the fuel injectors to adjust a relative amount of air and fuel delivered to each cylinder.

At 318, the ignition timing of the cylinder may be adjusted according to the two stroke cycle to ignite the mixture of air and fuel formed within the cylinder. For example, the control system may be configured to adjust the timing at which an ignition spark is delivered to the combustion chamber by spark plug 292 via ignition system 288.

Note that in other embodiments where spark plug 292 is omitted, such as with diesel or auto-ignition based engine applications, the ignition timing may be adjusted by varying the timing at which the fuel injection is initiated within the relevant stroke. Thus, in at least some embodiments, ignition timing may be related to the fuel delivery timing performed at 316. From 318, the routine may return where the valves operation, fuel injection, and ignition timing may be adjusted and performed for subsequent engine cycles.

Returning to the four stroke cycle, at 324, fuel delivered to the cylinder may be adjusted according to the selected four stroke cycle. For example, the control system may be configured to adjust the fuel injection timing of fuel injector 266 via driver 268 so that fuel is delivered to the combustion chamber every four strokes. The fuel delivered to the cylinder can be mixed with intake air received by the cylinder from a previous intake event at 322 as well as products of combustion retained in the cylinder from a previous combustion event. Further, the control system can vary the pulse-width of the fuel injectors to adjust a relative amount of air and fuel delivered to each cylinder.

At 326 the ignition timing of the cylinder may be adjusted according to the four stroke cycle to ignite the mixture of air and fuel formed within the cylinder. For example, the control system may be configured to adjust the timing at which an ignition spark is delivered to the combustion chamber by spark plug 292 via ignition system 288. From 326 the routine may return where the valve operation, fuel injection, and ignition timing may be adjusted and performed for subsequent engine cycles.

Figure 4:
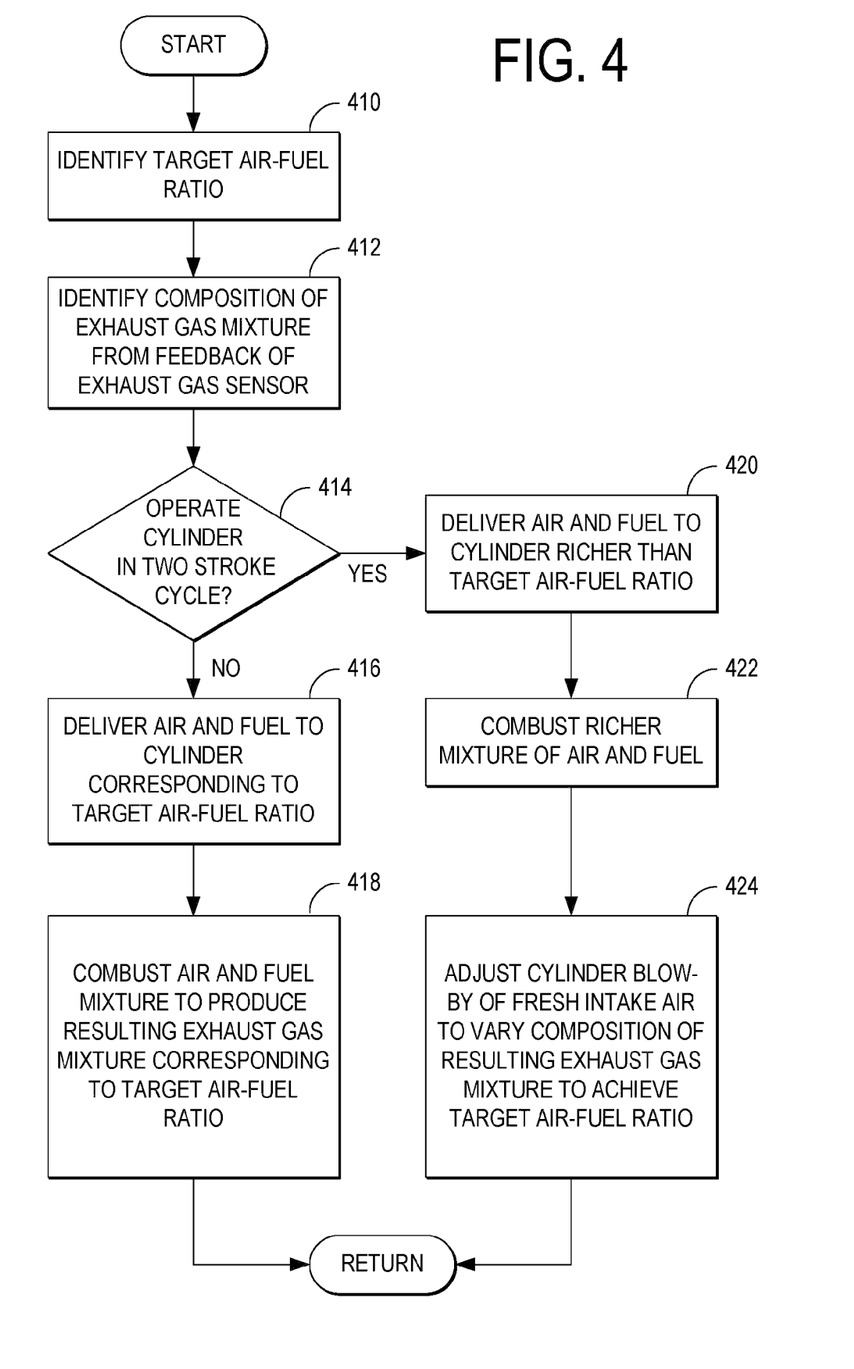
FIG. 4 depicts an example process flow for varying operation of the internal combustion engine to control exhaust gas composition in each of the two stroke cycle and four stroke cycle operations.

FIG. 4 depicts an example process flow for varying operation of the internal combustion engine to control exhaust gas composition in each of the two stroke cycle and four stroke cycle operations.

At 410, a target exhaust gas composition may be identified. For example, the control system can identify a target air-fuel ratio for the exhaust gas produced by the engine in response to one or more of the operating conditions identified at 310. As a non-limiting example, the control system may identify a target air-fuel ratio as an exhaust gas composition that corresponds to a stoichiometric mixture (e.g. an approximate air-fuel ratio of 14.7) of air and fuel delivered to and ignited at the engine. As another non-limiting example, the control system may identify a target air-fuel ratio as an exhaust gas composition that corresponds to a richer than stoichiometric air and fuel mixture (e.g. an air-fuel ratio that is less than 14.7). As yet another example, the control system may identify a target air-fuel ratio as an exhaust gas composition that corresponds to a leaner than stoichiometric air and fuel mixture (e.g. an air-fuel ratio that is greater than 14.7). In some examples, the target air-fuel ratio can correspond to an exhaust gas composition that is suitable for the exhaust after treatment device. For example, the exhaust after treatment device may function optimally at stoichiometry during some conditions, while purging of the exhaust after treatment device may be at times performed by periodically reducing the elemental oxygen concentration of the exhaust gases. Thus, the target air-fuel ratio identified at 410 may be any value that is suitable for the operating conditions assessed at 310.

At 412, the composition of the exhaust gas mixture produced by the engine may be identified from feedback received from an exhaust gas sensor. For example, the control system may be configured to identify an air-fuel ratio of an air and fuel mixture that was combusted at the engine from feedback received from exhaust gas sensor 226.

At 414, it may be judged whether to operate the engine or a cylinder thereof in a two stroke cycle. For example, the answer at 414 may judged in response to operating conditions as previously described with reference to the operation at 312. If the answer at 414 is judged yes, the process flow may proceed to 420. Alternatively, if the answer at 414 is judged no, the process flow may instead proceed to 416.

At 420, where the two stroke cycle is performed by the engine or a cylinder of the engine, air and fuel may be delivered to the cylinders that are carrying out the two stroke cycle in a ratio that corresponds to an air-fuel ratio that is richer (e.g.

includes a greater proportion of fuel relative to air) than the target air-fuel ratio identified at 410. For example, where the target air-fuel ratio identified at 410 was approximately 15 to 1 air to fuel, an air-fuel ratio of less than 15 to 1 may be provided to the cylinders carrying out the two stroke cycle.

At 422, the richer than target mixture of air and fuel that was delivered to the engine at 420 may be combusted at 422. For example, the ignition timing may be adjusted according to the operation at 318 in accordance with the two stroke cycle.

After initiation of the combustion event at 422, at 424, fresh intake air may be permitted to enter the cylinder via one or more of the intake valves, where it can mix with the combusted air and fuel mixture as it is exhausted from the cylinder via one or more exhaust valves. In other words, intake air may be permitted to pass through the cylinder via the intake and exhaust valves, which may referred to as "blow-by". In this way, the fresh intake air may be added to the richer exhaust stream that is produced by the engine cylinder to form a resulting exhaust gas mixture that is closer to the target air-fuel ratio. Since the fresh intake air includes a higher concentration of elemental oxygen than the combusted air and fuel mixture, the addition of the fresh intake air may en-lean the resulting exhaust gas mixture to a value that is closer to or at the target air-fuel ratio than the combusted air and fuel mixture.

At 424, operating parameters of the engine may be adjusted to vary the relative amount of fresh intake air that is combined with the exhaust stream generated by the combustion of the richer mixture of air and fuel. As a non-limiting example, operating parameters, including one or more of valve timing, intake manifold pressure, and boost pressure may be adjusted to vary the relative amount of fresh intake air that is combined with the exhaust stream.

Figure 5A:
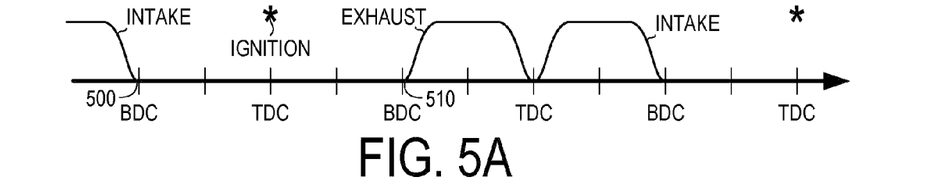
FIGS. 5A-5E depict timelines further illustrating the process flows of FIGS. 3 and 4.
Figure 5B:
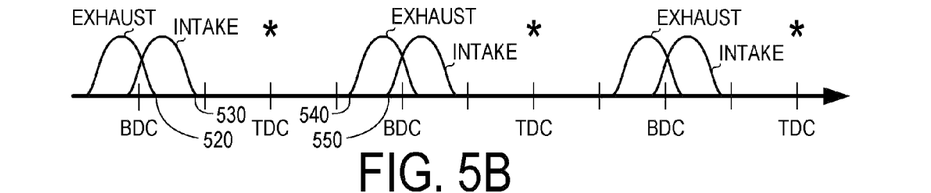
Figure 5C:
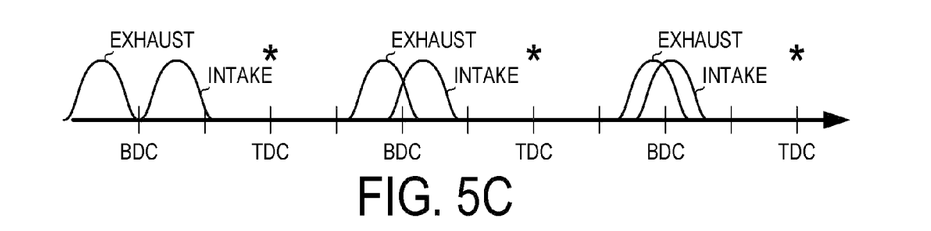
Figure 5D:
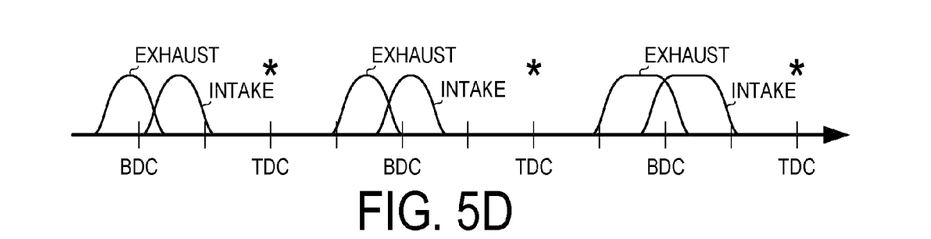
Figure 5E:
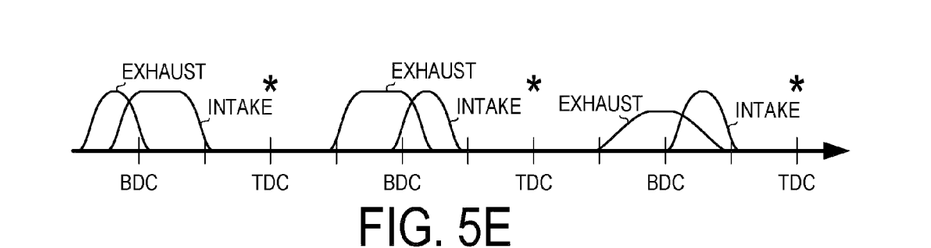

For example, the control system may adjust valve timing by increasing or decreasing an opening overlap between one or more of the intake and exhaust valves, as depicted in FIGS. 5C, 5D, and 5E. Note that the opening overlap between the intake and exhaust valves may be adjusted by varying one or more operating parameters of the intake and/or exhaust valves, including: valve opening timing, valve closing timing, valve opening dwell (i.e. time or crank angle at which the valve is opened), valve lift height, etc. The inventor has recognized that by increasing the opening overlap between the intake and exhaust valves, the amount of fresh intake air that passes through the cylinder without undergoing combustion (i.e. blow-by) may be increased. Conversely, by reducing the opening overlap between the intake and exhaust valves, the amount of fresh intake air that passes through the cylinder without undergoing combustion may be reduced.

Alternatively or additionally, the control system may increase or decrease the amount of fresh intake air that passes through the cylinder without undergoing combustion by adjusting the pressure at which the intake air is provided to the engine. For example, the intake air pressure received at the cylinder (e.g. intake manifold pressure) may be increased to increase the amount of fresh intake air passing through the cylinder during the two stroke mode by increasing boost pressure provided by a boosting device and/or by increasing an opening of an intake throttle. Conversely, the intake air pressure received at the cylinder may be reduced to reduce the amount of fresh intake air passing through the cylinder by reducing boost pressure and/or reducing the opening of the intake throttle.

Operating parameters such as the valve opening overlap and/or intake air pressure may be adjusted in response to the operating conditions identified by the control system. For example, as described at 412, the control system may utilize feedback received from an exhaust gas sensor to identify the actual composition of the resulting exhaust gas mixture, including the products of the combusted air and fuel mixture and the fresh intake air that are exhausted by the engine. In response to this feedback, the control system may adjust one or more of the valve timing (e.g. to vary intake and exhaust valve overlap) and/or boosting device and/or throttle to increase or decrease the amount of intake air blow-by.

As a non-limiting example, the control system may respond to feedback received from the exhaust gas sensor that indicates a richer than target air-fuel ratio by increasing the opening overlap of the intake and exhaust valves. Additionally or alternatively, the control system may respond to this feedback indicating the richer than target air-fuel ratio by increasing intake air pressure received at the cylinder via boost or throttle control. In this way, the resulting exhaust gas mixture may be en-leaned with an increased amount of blow-by, thereby providing an exhaust composition to the exhaust after treatment device that is closer to the target air-fuel ratio.

As another non-limiting example, the control system may respond to feedback received from the exhaust gas sensor that indicates a leaner than target air-fuel ratio by reducing the opening overlap of the intake and exhaust valves. Additionally or alternatively, the control system may respond to this feedback indicating the leaner than target air-fuel ratio by reducing intake air pressure received at the cylinder via boost or throttle control. In this way, the resulting exhaust gas mixture may be en-riched by a decreased amount of blow-by, thereby providing an exhaust composition to the exhaust after treatment device that is closer to the target air-fuel ratio.

Further still, in some embodiments, the fuel injector pulse-width may be adjusted to vary the air-fuel ratio of the combusted air and fuel mixture before it is combined with the blow-by intake air. As a non-limiting example, the control system may utilize fuel injector pulse-width control to more rapidly adjust the air-fuel ratio of the resulting exhaust gas mixture, while valve timing and intake air pressure control may be utilized to respond to longer term adjustments to the air-fuel ratio of the resulting exhaust gas mixture. For example, the fuel injector pulse-width can be increased at a higher bandwidth than a reduction in valve opening overlap and/or boost pressure to en-rich the air-fuel ratio of the resulting exhaust gas mixture. Similarly, the fuel injector pulse-width can be reduced at a higher bandwidth than an increase in valve opening overlap and/or boost pressure to en-lean the air-fuel ratio of the resulting exhaust gas mixture.

In this way, at least a portion of the oxygen rich intake air inducted into the cylinder by the intake valves subsequent to initiating combustion of the air and fuel mixture may be supplied to the exhaust passage of the engine via the cylinder without undergoing combustion. The oxygen rich intake air that is provided to the exhaust passage may be mixed with the exhaust gases produced by combustion to form a resulting exhaust gas mixture that is at or nearer to the target air-fuel ratio than the air and fuel mixture delivered to the cylinder at 420. From 424, the process flow may return for subsequent cycles.

Referring to 416, an air and fuel mixture corresponding to the target air-fuel ratio identified at 410 may be delivered to the cylinders that are not performing the two stroke cycle. For example, where a stoichiometric air and fuel ratio is to be achieved, the fuel injector pulse-width may be adjusted so that the amount of fuel corresponds to the amount of air inducted into the cylinder for the given intake manifold pressure, with or without feedback from one or more exhaust gas oxygen sensors.

At 418, the air and fuel mixture may be combusted to produce a resulting exhaust gas mixture that corresponds to the target air-fuel ratio identified at 410. Note that errors between the actual air and fuel mixture produced by the engine at 418 may be adjusted in response to feedback received from exhaust gas sensor at 412. In contrast to the approach utilized during the two stroke cycle where a richer than target air and fuel mixture is combusted at the engine, the target amount of air and fuel may be delivered to the engine when performing four stroke cycles. In this way, the resulting composition of exhaust gases exhausted from the cylinder may be adjusted during the four stroke cycle by adjusting a fuel injector pulse-width to vary a relative amount of fuel contained in the combusted air and fuel mixture. From 418, the process flow may return for subsequent cycles.

FIGS. 5A-5E depict timelines further illustrating the process flows of FIGS. 3 and 4 for an example cylinder of an internal combustion engine. In each of these timelines, time progresses from left to right and further depicts the position of a piston of the cylinder at top dead center (TDC) and bottom dead center (BDC) positions.

Referring to FIG. 5A, a four stroke cycle is depicted. Beginning on the left end of the timeline, an intake valve opening event is depicted during an intake stroke before BDC, followed by compression of the intake air charge as the piston moves from BDC to TDC. At a timing near TDC, the compressed intake air charge and injected fuel may be ignited, thereby initiating the power stroke as the piston moves from TDC to BDC. As the piston returns to TDC from the BDC position, products of combustion may be exhausted from the cylinder by the piston as one or more of the exhaust valves are opened during the exhaust stroke. This four stroke cycle may be repeated with the subsequent intake event as the piston again moves from TDC to BDC entraining a new intake air charge into the cylinder via one or more of the intake valves. As one example, the four stroke cycle may correspond to a period of approximately 720 crank angle degrees or 2 full revolutions of the crankshaft.

Referring to FIG. 5B, a two stroke cycle is depicted without opening overlap between the intake and exhaust valves. Beginning again on the left end of the timeline, one or more exhaust valves may be opened as the piston approaches BDC to exhaust products of combustion of a previous combustion event from the cylinder. One or more of the intake valves may be opened to admit a fresh air charge into the cylinder for the next combustion event. Fuel may be supplied to the cylinder by direct injection or in the case of port injection, the fuel may be entrained into the cylinder via the intake valve as it is opened to admit the intake air. Around TDC, the air and fuel mixture may be ignited causing the piston to move from TDC to BDC where the products of combustion may be again exhausted from the cylinder via one or more of the exhaust valves. As one example, the two stroke cycle may correspond to a period of approximately 360 crank angle degrees or 1 full revolution of the crankshaft. Thus, the two stroke cycle can perform twice as many combustion events as the four stroke cycle over a given period of time.

Referring to FIG. 5C, the two stroke cycle is depicted where intake and/or exhaust valve timing may be adjusted to vary the exhaust gas composition as described in FIG. 4. Beginning again on the left end of the timeline, the first exhaust and intake valve events do not overlap as shown in FIG. 5B. However, FIG. 5B further depicts how the opening overlap between the intake and exhaust valves may be increased with each subsequent cycle. By increasing the overlap between the opening of one or more intake valves and one or more exhaust valves, the amount of cylinder scavenging and cylinder blow-by may be increased. Thus, as the opening overlap between the intake and exhaust valves is increased, additional oxygen rich intake air may pass through the cylinder without being combusted, thereby increasing the oxygen content of the resulting exhaust gas mixture that issues from the cylinder.

In this way, an air-fuel ratio of an air and fuel mixture that is ignited within the cylinder (e.g. as previously described at 422) may be en-leaned toward a target air-fuel ratio with the addition of intake air that flows through the cylinder via the opening overlap of the intake and exhaust valves. Note that where a richer resulting exhaust gas mixture is desired, the opening overlap between the intake and exhaust valves may be reduced to reduce the amount of oxygen rich intake air flowing through the cylinder without undergoing combustion.

FIGS. 5D and 5E depict other examples of how the intake and/or exhaust valve timing may be adjusted to vary an amount of intake air that mixes with the exhaust gases to produce a resulting exhaust gas mixture having a target air-fuel ratio. For example, with the first exhaust and intake valve events, the exhaust valve timing may be retarded relative to the intake valve timing while maintaining a similar opening dwell of the intake and/or exhaust valves. As shown at the second set of exhaust and intake valve events, the intake valve timing may be advanced relative to the exhaust valve timing while maintaining a similar opening dwell of the intake and/or exhaust valves. As shown with the final set of intake and exhaust valve events, the opening timing of the intake valve may be advanced and the closing timing of the exhaust valve closing may be retarded, thereby increasing the opening dwell of the intake and exhaust valves.

Referring to FIG. 5E, as depicted with the first set of valve events, the exhaust valve timing may remain constant while the intake valve opening timing may be advanced, thereby increasing the opening dwell of one or more intake valves. As depicted with the second set of valve events, the intake valve timing may remain constant while the exhaust valve closing timing may be retarded, thereby increasing the opening dwell of one or more of the exhaust valves. Finally, as depicted with the last valve event of FIG. 5E, the valve lift and/or valve timing of one or more of the exhaust valves may be adjusted to vary valve opening overlap. Note that in other examples, the intake valve lift and/or timing may be adjusted to vary valve opening overlap. Thus, it should be appreciated that the valve timing examples shown in FIGS. 5C, 5D, and 5E depict various ways in which valve timing may be adjusted to vary an amount of valve opening overlap to thereby adjust an oxygen content of the resulting exhaust gas mixture that is delivered to the exhaust passage of the engine.

Figure 6A:
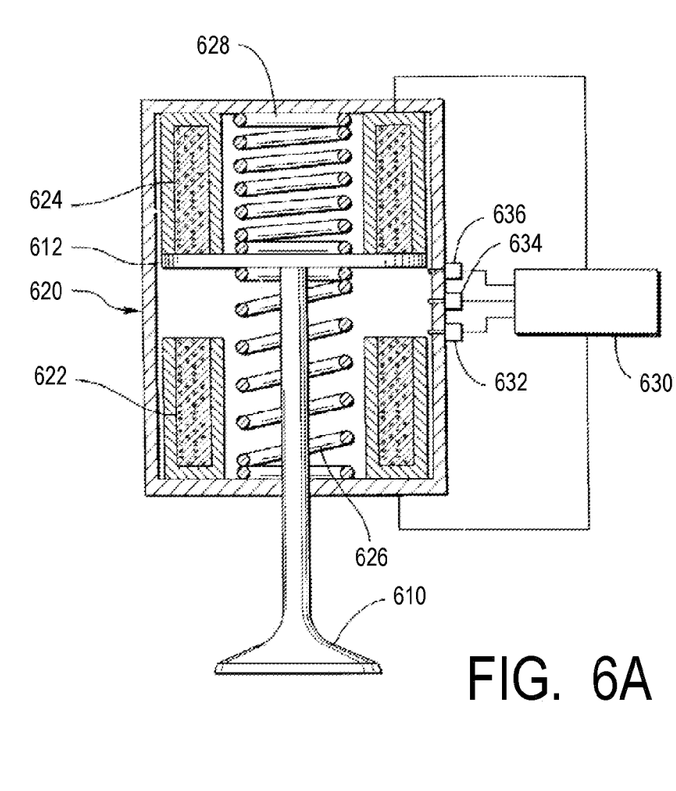
FIGS. 6 and 7 depict example valve actuators that may be used to control operation of intake and exhaust valves of an internal combustion engine.
Figure 6B:
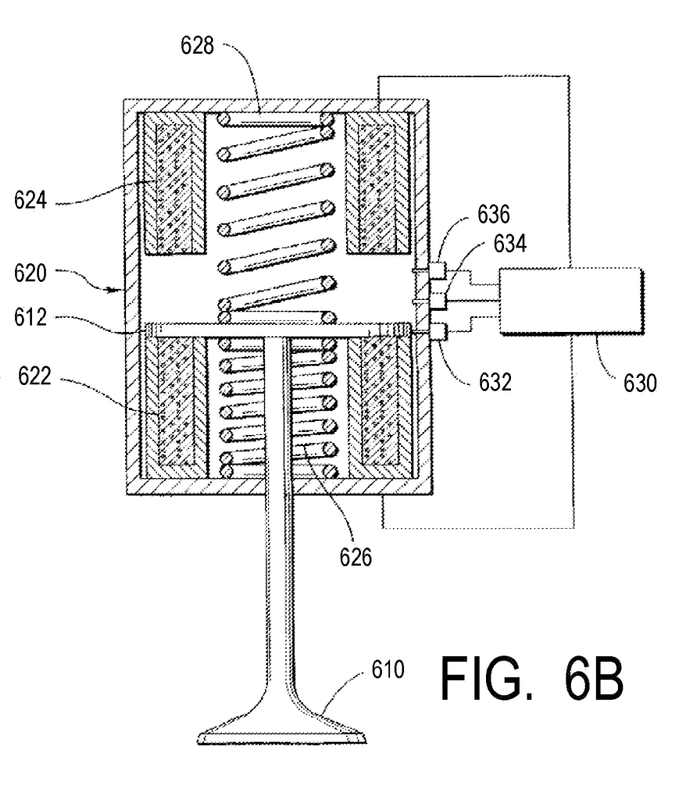
Figures 7A, 7B:
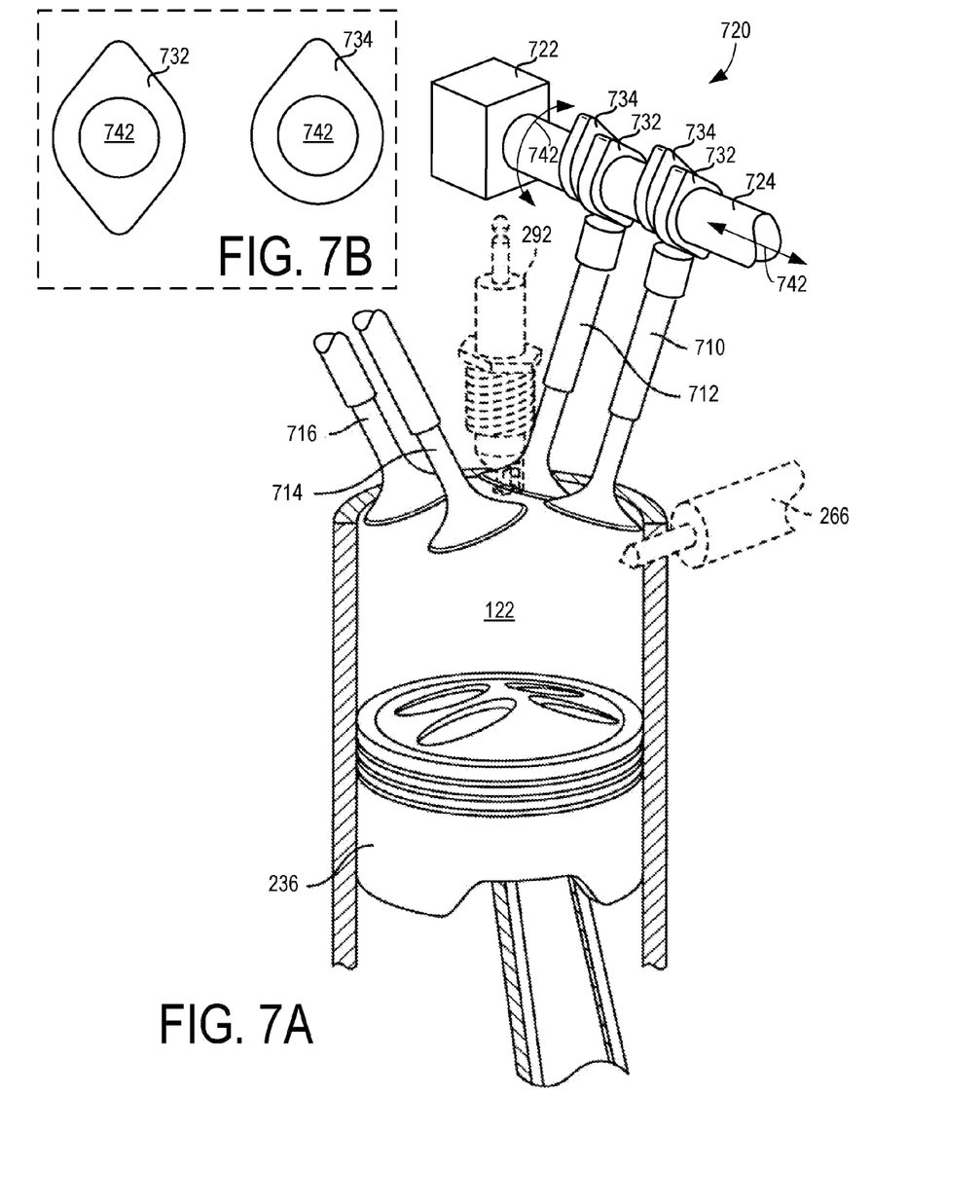

FIGS. 6 and 7 depict non-limiting examples of the previously described valve actuators 251 and 253. FIGS. 6A and 6B depict an example embodiment of an electromagnetic valve actuator (EVA) while FIGS. 7A and 7B depict an example embodiment of a valve actuation system including cam profile switching (CPS) and variable valve timing (VVT).

Referring specifically to FIG. 6A, an EVA 620 for a poppet valve 610 is depicted. Valve 610 may refer to one or more of the previously described intake or exhaust valves of engine 110 as depicted at 252 and 254 in FIG. 2. Similarly, EVA 620 may refer to one or more of the previously described intake or exhaust valve actuators of engine 110 as depicted at 251 and 253 in FIG. 2.

EVA 620 may include one or more coils for generating a magnetic field that can be used to selectively move an armature 612 of valve 610 between two or more positions as shown in FIGS. 6A and 6B. In this way, valve 610 may be opened and closed by the control system by varying the electrical energy supplied to each coil. In this particular embodiment, EVA 620 includes a lower coil 622 and an upper coil 624. EVA 620 may also include one or more springs biasing valve 610 in a particular position via armature 612. In this embodiment, EVA 620 includes an upper spring 628 and a lower spring 626.

EVA 620 may include one or more valve position sensors indicated schematically at 632, 634, and 636. One or more of these valve position sensors can correspond to sensors 255 and 257 of FIG. 2. As previously described with reference to FIG. 2, control system 112 can receive valve position information from the valve actuators and can adjust the valve opening and closing timing in response to operating conditions and the selected number of strokes per cycle. In the embodiment shown in FIGS. 6A and 6B, a controller 630 is depicted in communication with sensors 632, 634, and 636, as well as being electrically coupled with coils 622 and 624. By varying the electrical energy supplied to each coil, the position of the armature and hence the valve can be adjusted by controller 630. Note that controller 630 may form a component of control system 112 or may be integrated into EVA 620 where it may communicate with control system 112.

Referring now to FIGS. 7A and 7B, an example embodiment of a valve actuation system 720 including cam profile switching (CPS) and variable valve timing (VVT) will be described in the context of cylinder 122 of FIG. 1. As one example, valve actuation system 720 may refer to one or more of valve actuators 251 and 253 of FIG. 1. As shown in FIG. 7A, cylinder 122 is shown optionally to include spark plug 292 and fuel injector 266 configured as a direct fuel injector.

Cylinder 122 is depicted as including two intake valves and two exhaust valves in this particular example. For example, valves 710 and 712 may refer to one of intake or exhaust poppet valves while valves 714 or 716 may refer to the other of intake or exhaust poppet valves. As shown in FIG. 7A, valves 710 and 712 are driven by one or more cams arranged on camshaft 724. For example, each of valves 710 and 712 may each be selectively driven by one of cams 732 and 734. As shown in FIG. 7B, cams 732 and 734 can have different cam profiles. For example, cam 732 may include two cam lobes and be utilized to drive valves 710 and 712 according to a two stroke cycle while cam 734 may include one cam lobe and be utilized to drive valves 710 and 712 according to a four stroke cycle. As a non-limiting example, cam shaft 724 may be driven by crank shaft 240 of engine 110.

Valves 714 and 716 may include a similar valve actuation system as depicted at 720, including one or more selectable cams to enable the cylinder to be operated in a two stroke cycle and a four stroke cycle depending on operating conditions. In other embodiments, valve actuation system 720 may be utilized to drive each of valves 710, 712, 714, and 716 via a common cam shaft.

Valve actuation system 720 may include one or more devices configured to perform cam profile switching and/or variable valve timing. For example, device 722 may be configured to provide cam profile switching by translating cam shaft 724 as indicated at 742. In this way, control system 110 can utilize valve actuation system 720 to enable the appropriate cam to be selected to drive the valves according to the prescribed two or four stroke cycle. Further, device 722 may be configured to provide variable valve timing by adjusting the rotational position of camshaft 724 as indicated at 744 relative to the rotational position of crankshaft 240. In this way, the timing of the valve opening and closing may be advanced or retarded as directed by the control system in accordance with the previously described process flows and timelines. Note that in other examples, two or more distinct devices may be utilized to provide cam profile switching and variable valve timing.

Further, it should be appreciated that in still other embodiments, cam profile switching may be provided without requiring translation of the crankshaft relative to the valves, but a portion of the valve stem that interfaces with the cams may be adjusted to selectively interface with one of cam profiles 732 and 734, as just one example. For example, lost motion devices may be utilized operatively between the valve stem and the cam follower, whereby a particular cam is selected by locking the lost motion device and the cam is unselected by unlocking the lost motion device.

Figure 8:
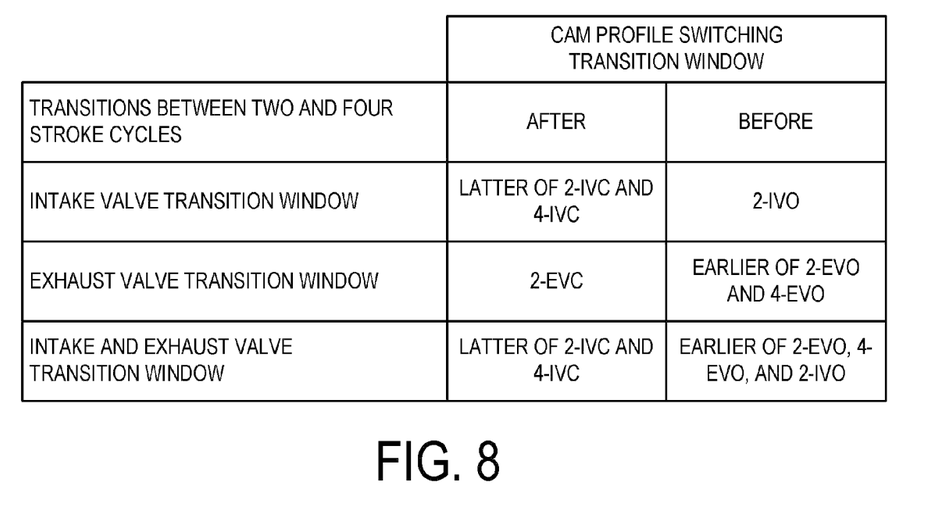
FIG. 8 is a table depicting an example approach for transitioning a cylinder of the engine between two and four stroke cycles with a cam profile switching system.

FIG. 8 provides a table depicting a non-limiting example of a transition between a two stroke cycle and a four stroke cycle may be facilitated by a cam profile switching system, such as described with reference to FIG. 7, among other cam profile switching systems. FIG. 8 depicts three different types of transitions that may be performed from the two stroke cycle to the four stroke cycle or from the four stroke cycle to the two stroke cycle. The table depicts a transition window as being defined as a first timing or crank angle after which the transition is to be initiated and a second timing or crank angle before which the transition is to be completed.

The transition window for a transition of the intake valves between the two and four stroke cycle includes initiating the cam profile switching operation after the latter of the intake valve closing in the two stroke cycle (2-IVC) and the intake valve closing in the four stroke cycle (4-IVC), and completing the cam profile switching operation before intake valve opening in the two stroke cycle (2-IVO). Referring also to FIGS. 5A and 5B, 2-IVC is depicted at 530, 4-IVC is depicted at 500, and 2-IVO is depicted at 550. In this way, a transition between two and four stroke operation can be performed when the intake valves of the cylinder are on the base circle of each of the two and four stroke cams (e.g. cams 732 and 734).

The transition window for a transition of the exhaust valves between the two and four stroke cycle includes initiating the cam profile switching operation after the exhaust valve closing in the two stroke cycle (2-EVC), and completing the cam profile switching operation before the earlier of the exhaust valve opening in the two stroke cycle (2-EVO) and the exhaust valve opening in the four stroke cycle (4-EVO). Referring also to FIGS. 5A and 5B, 2-EVC is depicted at 530, 2-EVO is depicted at 540, and 4-EVO is depicted at 510. In this way, a transition between two and four stroke operation can be performed when the exhaust valves of the cylinder are on the base circle of each of the two and four stroke cams (e.g. cams 732 and 734).

The transition window for a transition of both the intake and exhaust valves between the two and four stroke cycle includes initiating the cam profile switching operation after the latter of the intake valve closing in the two stroke cycle (2-IVC) and the intake valve closing in the four stroke cycle (4-IVC), and completing the cam profile switching operation before the earlier of the exhaust valve opening in the two stroke cycle (2-EVO), the exhaust valve opening in the four stroke cycle (4-EVO), and the intake valve opening in the two stroke cycle (2-IVO). This transition may be performed where a single cam shaft is used for both intake and exhaust valves of the engine. In this way, a transition between two and four stroke operation can be performed when the intake and exhaust valves of the cylinder are on the base circle of each of the two and four stroke cams (e.g. cams 732 and 734).

Note that the example process flows included herein can be used with various engine or vehicle propulsion systems.

These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It should be appreciated that while many of the process flows have been described herein in the context of a control system implementation, in other examples, the various fuel delivery modes of operation may be manually selected by a user via a user input device, including one or more of a switch, a button, or a graphical user interface or display. It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
    boosting intake air;
    operating in a four-stroke cycle and adjusting a fuel amount combusted to obtain a target stoichiometric exhaust air-fuel ratio; and
    operating in a two-stroke cycle to combust a richer mixture than in the four-stroke cycle, and adjusting an opening overlap between an intake poppet valve and an exhaust poppet valve to obtain the target stoichiometric exhaust air-fuel ratio, including blow-by air.

2. The method of claim 1 wherein the opening overlap is adjusted by adjusting valve timing.

3. The method of claim 1 further comprising adjusting the boosting of intake air to obtain the target air-fuel ratio.

4. The method of claim 1 further comprising transitioning from the two-stroke cycle to the four-stroke cycle.

5. The method of claim 1 wherein during the two-stroke cycle, valve timing is adjusted to increase the opening overlap to increase oxygen content of the exhaust.

6. The method of claim 1 wherein during the two-stroke cycle, valve timing is adjusted to decrease the opening overlap to decrease oxygen content of the exhaust.

7. A method of operating an engine, comprising:
    boosting intake air;
    operating in a four-stroke cycle and adjusting a fuel amount combusted to obtain a target exhaust air-fuel ratio; and
    operating in a two-stroke cycle to combust a richer mixture than in the four-stroke cycle, and adjusting a timing of an intake poppet valve and an exhaust poppet valve to obtain the target exhaust air-fuel ratio, including blow-by air.

8. The method of claim 7 wherein the target exhaust air-fuel ratio is stoichiometry.

9. The method of claim 8 wherein adjusting the timing adjusts an overlap between the intake and exhaust poppet valves.

10. The method of claim 9 further comprising adjusting the boosting of intake air to obtain the target air-fuel ratio.

11. The method of claim 7 further comprising transitioning from the two-stroke cycle to the four-stroke cycle.

12. An engine method, comprising:
    boosting intake air;
    operating in a four-stroke cycle and adjusting a fuel amount combusted to obtain a target stoichiometric exhaust air-fuel ratio; and
    operating in a two-stroke cycle to combust a richer than stoichiometric mixture, and adjusting an opening overlap between intake and exhaust poppet valves and the intake air boosting to obtain the target stoichiometric exhaust air-fuel ratio, including blow-by air.

13. The method of claim 12 wherein the opening overlap is adjusted by adjusting valve timing.

14. The method of claim 13 further comprising transitioning from the two-stroke cycle to the four-stroke cycle.

15. The method of claim 13 wherein during the two-stroke cycle, valve timing is adjusted to increase the opening overlap to increase oxygen content of the exhaust and valve timing is adjusted to decrease the opening overlap to decrease oxygen content of the exhaust.

* * * * *